United States Patent [19]

Mor et al.

[11] Patent Number: 4,807,124
[45] Date of Patent: Feb. 21, 1989

[54] REGISTER ADDRESSING SYSTEM FOR EFFICIENT MICROROUTINE SHARING AND OPTIMIZATION

[75] Inventors: Yeshayahu Mor; Leonardo Sandman, both of Cupertino, Calif.; Yeshayahu Schatzberger, Haifa, Israel

[73] Assignee: Performance Semiconductor Corporation, Sunnyvale, Calif.

[21] Appl. No.: 912,310

[22] Filed: Sep. 26, 1986

[51] Int. Cl.[4] .......................... G06F 9/00; G06F 12/00
[52] U.S. Cl. .................................................. 364/200
[58] Field of Search ................. 364/200 MS, 900 MS

[56] References Cited

U.S. PATENT DOCUMENTS

| 3,725,868 | 4/1973 | Malmer, Jr. et al. | 364/200 |
| 3,938,103 | 2/1976 | Welin | 364/200 |
| 3,946,366 | 3/1976 | Edwards, Jr. | 364/200 |
| 3,972,025 | 7/1976 | Taddei | 364/200 |
| 4,087,854 | 5/1978 | Kinoshita et al. | 364/200 |
| 4,155,118 | 5/1979 | Lamiaux | 364/200 |
| 4,241,396 | 12/1980 | Mitchell et al. | 364/200 |
| 4,305,125 | 12/1981 | Sato et al. | 364/200 |
| 4,430,711 | 2/1984 | Anderson et al. | 364/200 |
| 4,446,517 | 5/1984 | Katsura et al. | 364/200 |
| 4,587,612 | 5/1986 | Fisk et al. | 364/200 |

Primary Examiner—Thomas M. Heckler
Assistant Examiner—Joseph T. Fitzgerald
Attorney, Agent, or Firm—Walter J. Madden, Jr.; Alan H. MacPherson; Paul J. Winters

[57] ABSTRACT

A microcoded data processing system utilizes common microcode execution routines for both register-to-register operations and memory-to-register operations. The system includes a memory data register for storing an operand for use in a memory-to-register operation, a pair of address registers for containing the addresses of the registers to be involved in the execution of register-to-register instructions, and circuitry responsive to generation of an instruction indicating a memory-to-register operation for generating the address of the memory data register from one of the address registers, whereby the register-to-register operations and the memory-to-register operations can share common execution routines without any performance time penalty or any increase in required microcode.

The system also provides for the simultaneous generation of the addresses of all registers to be employed in instructions involving multipart operands.

9 Claims, 7 Drawing Sheets

```
142
143
144       ;   | SINGLE PRECISION D,DX ( OPERAND )        |
145       ;   |                                          |
146       ;   |                                          |
147       ;   |    D  MUST BE ON EVEN ADDRESS            |
148       ;   |    DX MUST BE ON ODD  ADDRESS            |
149       ;   |                                          |
150       ;
151       ;
152           ORG H#020
153       ;
154           D.SP.O:: M.W A.IR.1,,DD1,,NO.DEST,          ; MAR <- IR ,F.IC++
155           /           ,B.ZERO,A.TRNS,
156           /           SP,A.OR.B,   ,AL.MA.IC,WAIT,
157  0020    /           DS.IRLAT,GOTO,F.IC
             11000 00011 0000100010 0 1 00 10010 10 00 00 0001 11111
             100 1 0 10001 010
158       ;
159           DX.SP.O:: M.W A.IR.1,B.SDLO, , ,NO.DEST,    ; MAR<IR+RX,F.IC++
160           /           SH.TRNS,  ,B.TRNS,A.TRNS,
161           /           SP,A.PLUS.B,  ,AL.MA.IC,WAIT,
162  0021    /           DS.IRLAT,CONT,F.IC
             11000 00011 0000000000 0 1 00 10010 00 00 00 0111 11111
             100 1 0 11111 010
163       ;
164           DD1:     M.W     ,     ,     ,NO.DEST,      ; MR , GO_EXEC
165           /           ,B.ZERO,A.ZERO,
166           /           SP,A.OR.B,MISC.DFL NO.OP,WAIT,
167  0022    /           DS.IRLAT,EXEC.PTR, MR
             00011 00011 0000000000 0 1 00 10010 10 11 00 0001 11111
             111 1 0 10010 000
168       ;
169       ;---------------------------------------------
170       ;
171       ;   |                                          |
172       ;   |         SINGLE PRECISION ISP             |
173       ;   |                                          |
174       ;   |      ISP : ODD   ADDRESS                 |
175       ;   |                                          |
176       ;   |                                          |
177       ;
178           ORG H#023
179           ISP.O:: M.W A.TEMP1,B.0.LO,   ,DST.A,DEST,  ; RA <- +(I+1)
180           /           ,B.00FF,A.ZERO,                  ; IMP T1
181           /           SP,A.PLS1.B,IMP.TMP1, , ,
182  0023    /           ,EXEC.PTR,MIO.NOP                 ; GO_EXEC
             10010 10111 0000000000 1 0 00 10010 11 11 00 0101 01110
             111 0 0 10010 111
183       ;
184       ;
185       ;   ________________________________________
186       ;   |                                          |
187       ;   | SINGLE PRECISION D,DX (EFFECTIVE ADDR)   |
188       ;   |                                          |
189       ;   |                                          |
190       ;   |   D  MUST BE ON EVEN ADDRESS             |
191       ;   |   DX MUST BE ON ODD  ADDRESS             |
192       ;   |                                          |
193       ;   ----------------------------------------
194       ;
195           ORG H#024
196       ;
```

FIG. 4

```
354   ;
355   ;
356   ;-----------------------------------------------------------
357   ;
358   ;         !                                                 !
359   ;         ! DOUBLE PRECISION D,DX ( OPERAND )               !
360   ;         !                                                 !
361   ;         !                                                 !
362   ;         !     D   MUST BE ON EVEN ADDRESS                 !
363   ;         !     DX  MUST BE ON ODD  ADDRESS                 !
364   ;         !                                                 !
365   ;         -------------------------------------------------
366   ;
367       ORG H#036
368       D.DP.O:: M.W A.IR.1,,DDP,,NO.DEST,        ; MAR <- IR ,F.IC++
369       /            ,B.ZERO,A.TRNS,
370       /            SP,A.OR.B,  ,AL.MA.IC,WAIT,
371 0036  /            DS.IRLAT,GOTO,F.IC
      11000 00011 0000111000 0 1 00 10010 10 00 00 0001 11111
      100 1 0 10001 010

372   ;
373       DX.DP.O:: M.W A.IR.1,B.SDLO, , ,NO.DEST,  ; MAR<IR+RX,F.IC++
374       /            SH.TRNS,   ,B.TRNS,A.TRNS,
375       /            SP,A.PLUS.B,  ,AL.MA.IC,WAIT,
376 0037  /            DS.IRLAT,CONT,F.IC
      11000 00011 0000000000 0 1 00 10010 00 00 00 0111 11111
      100 1 0 11111 010

377   ;
378       DDP:    M.W   ,   ,   ,NO.DEST,             ; MR
379       /          ,B.ZERO,A.ZERO,                  ; MAR++
380       /          SP,A.OR.B,MISC.DFL,INCR.MAR,WAIT,
381 0038  /          DS.IRLAT,CONT, MR
      00011 00011 0000000000 0 1 00 10010 10 11 00 0001 11111
      110 1 0 11111 000

382   ;
383           M.W A.TEMP1,B.MDR,  ,DST,A,DEST,       ;
384       /            ,B.TRNS,A.ZERO,                ; TI <- MDR
385       /          SP,A.OR.B,IMP.TMP1,  ,WAIT,      ; IMP TEMP1
386 0039  /          DS.IRLAT,EXEC.PTR,MR             ; MR, GO_EXEC
      10010 10011 0000000000 1 0 00 10010 00 11 00 0001 01110
      111 1 0 10010 000

387   ;
388   ;
389   ;         !                                                 !
390   ;         ! DOUBLE PRECISION I,IX ( OPERAND )               !
391   ;         !                                                 !
392   ;         !                                                 !
393   ;         !     I   MUST BE ON EVEN ADDRESS                 !
394   ;         !     IX  MUST BE ON ODD  ADDRESS                 !
395   ;         !                                                 !
396   ;         -------------------------------------------------
397   ;
398       ORG H#03A
399       I.DP.O:: M.W A.IR.1,,IIP,,NO.DEST,       ; MAR <- IR ,F.IC++
400       /            ,B.ZERO,A.TRNS,
401       /            SP,A.OR.B,  ,AL.MA.IC,WAIT,
402 003A  /            DS.IRLAT,GOTO,F.IC
      11000 00011 0000111100 0 1 00 10010 10 00 00 0001 11111
      100 1 0 10001 010

403   ;
404       IX.DP.O:: M.W A.IR.1,B.SDLO, , ,NO.DEST,  : MAR<IR+RX,F.IC++
```

```
                    ┌─────────────────────────────────┐
                    │                                 │
                    │   EXTENDED ADDRESSING FOR D,DX  │
                    │                                 │
                    │   D  MUST BE ON EVEN ADDRESS    │
                    │   DX MUST BE ON ODD  ADDRESS    │
                    │                                 │
                    └─────────────────────────────────┘

ORG H#042
      D.EX.O:: M.W A.IR.1, ,DEX, ,NO.DEST,                          ; MAR <- IR  ,F.IC++
              ,B.ZERO,A.TRNS,
              SP,A.OR.B, ,AL.MA.IC,WAIT,
              DS,IRLAT,GOTO,F.IC
0042  11000 00011 000100000100 0 1 00 10010 10 00 00 0001 11111
      100 1 0 10001 010

DX.EX.O:: M.W A.IR,1,B.SDLO, ,NO.DEST,                        ; MAR<IR+RX,F.IC++
              SH.TRNS, ,B.TRNS,A.TRNS,
              SP,A.PLUS.B, ,AL.MA.IC,WAIT,
              DS,IRLAT,CONT,F.IC
0043  11000 00011 000000000 0 1 00 10010 00 00 00 0111 11111
      100 1 0 11111 010

DEX:    M.W        ,    ,B.ZERO,A.ZERO,         ,NO.DEST,    ; MR
              SP,A.OR.B,MISC.DFL,INCR.MAR,WAIT,                    ; MAR++
              DS,IRLAT,CONT, MR
0044  00011 00011 000000000 0 1 00 10010 10 11 00 0001 11111
      110 1 0 11111 000

M.W A.TEMP2,B.MDR, ,DST,A,DEST,                       ; T2 <- MDR
                    ,B.TRNS,A.ZERO,                                 ; MR
              SP,A.OR.B,MISC.DFL,INCR.MAR,WAIT,                     ; MAR++
              DS,IRLAT,CONT, MR
0045  10001 10011 000000000 1 0 00 10010 00 11 00 0001 11111
      110 1 0 11111 000

M.W A.TEMP1,B.MDR, ,DST,A,DEST,                       ; T1 <- MDR
                    ,B.TRNS,A.ZERQ,                                 ; IMP TEMP2
              SP,A.OR.B(IMP.TMP2) ,WAIT,                            ; MR, GO_EXEC
              DS,IRLAT,EXEC.PTR,MR
0046  10010 10011 000000000 1 0 00 10010 00 11 00 0001 10001
      111 1 0 10010 000
```

FIG. 5

```
;FIELD:  MASRC(0:4)           DEFAULT = 00011.
;
A.BASE.R:   EQU  B#00000          ; SELECT BASE_REG (CHAN.0) TO A.BUS
A.SDLO.2:   EQU  B#00001          ; SELECT SDLO+2 (CHAN.1) TO A.BUS
A.SDLO.1:   EQU  B#00010          ; SELECT SDLO+1 (CHAN.2) TO A.BUS
A.SDLO:     EQU  B#00011          ; SELECT SDLO   (CHAN.3) TO A.BUS
A.SDHI.2:   EQU  B#00100          ; SELECT SDHI+2 (CHAN.4) TO A.BUS
A.SDHI.1:   EQU  B#00101          ; SELECT SDHI+1 (CHAN.5) TO A.BUS
A.SDHI:     EQU  B#00110          ; SELECT SDHI   (CHAN.6) TO A.BUS
A.PIR:      EQU  B#01111          ; SELECT PIR    TO THE A.BUS
A.MKR:      EQU  B#01000          ; SELECT MKR    TO THE A.BUS
A.FTR:      EQU  B#01001          ; SELECT FTR    TO THE A.BUS
A.IC:       EQU  B#01010          ; SELECT IC     TO THE A.BUS
A.SWR:      EQU  B#01011          ; SELECT SWR    TO THE A.BUS
A.MAR:      EQU  B#01100          ; SELECT MAR    TO THE A.BUS
A.TIMA:     EQU  B#01101          ; SELECT TIMA   TO THE A.BUS
A.TIMB:     EQU  B#01110          ; SELECT TIMB   TO THE A.BUS
A.REG15:    EQU  B#01111          ; SELECT REG15  TO THE A.BUS
A.Q0:       EQU  B#10000          ; SELECT Q0     TO THE A.BUS
A.TEMP2:    EQU  B#10001          ; SELECT TEMP2  TO THE A.BUS
A.TEMP1:    EQU  B#10010          ; SELECT TEMP1  TO THE A.BUS
A.MDR:      EQU  B#10011          ; SELECT MDR    TO THE A.BUS
A.Q1:       EQU  B#10100          ; SELECT Q1     TO THE A.BUS
A.SP.RG0:   EQU  B#10101          ; SELECT SP.REG0 TO THE A.BUS
A.CONFIG:   EQU  B#10110          ; SELECT A 16 BIT WORD CONSISTING
                                  ; OF THE CONFIG BITS IN THE MOST
                                  ; SIGNIFICANT 5 BITS AND THE HI
A.XX0HI:    EQU  B#10110          ; REG IN THE LEAST SIGNIFICANT
                                  ; 4 BITS TO THE A.BUS

A.ESP.R1:   EQU  B#11011          ; SELECT ESP.REG1 TO THE A.BUS
                                  ; ESP.REG1 IS READ ONLY
A.IR.1:     EQU  B#11000          ; SELECT IR     TO THE A.BUS
A.IR.2:     EQU  B#11010          ; SELECT IR     TO THE A.BUS
A.IR.3:     EQU  B#11100          ; SELECT IR     TO THE A.BUS
A.IR.4:     EQU  B#11110          ; SELECT IR     TO THE A.BUS
A.CONS:     EQU  B#11111          ;SELECT CONSOLE_REG (CHANNEL.0) TO THE A.BUS
```

FIG. 6A

```
;FIELD:   MBSRC(0:4)        DEFAULT = 00011.
;
;

B.SDLO.2:   EQU   B#00001   ;SELECT SDLO.2 (CHANNEL.1) TO THE B.BUS
B.SDLO.1:   EQU   B#00010   ;SELECT SDLO.1 (CHANNEL.2) TO THE B.BUS

B.SDLO:     EQU   B#00011   ;SELECT SDLO   (CHANNEL.3) TO THE B.BUS
B.SDHI.2:   EQU   B#00100   ;SELECT SDHI.2 (CHANNEL.4) TO THE B.BUS
B.SDHI.1:   EQU   B#00101   ;SELECT SDHI.1 (CHANNEL.5) TO THE B.BUS
B.SDHI:     EQU   B#00110   ;SELECT SDHI   (CHANNEL.6) TO THE B.BUS
B.SP.RG0:   EQU   B#01011   ;SELECT SP.REG0           TO THE B.BUS
B.SP.RG1:   EQU   B#01000   ;SELECT SP.REG1           TO THE B.BUS
            ;                SP.REG1 IS READ ONLY

B.IPT:      EQU   B#01100   ;SELECT IPT TO THE B.BUS
B.SH.COU:   EQU   B#01101   ;SELECT Q1 MS BYTE AND SH.COU TO THE B.BUS
B.XXXHI:    EQU   B#01110   ;SELECT HI TO B.BUS (12:15), 0 TO B.BUS(0)
            ;                AND CSUB_LAT TO B.BUS(0)

B.REG15:    EQU   B#01111   ;SELECT REG15    TO THE B.BUS
B.Q0:       EQU   B#10000   ;SELECT Q0       TO THE B.BUS
B.TEMP2:    EQU   B#10001   ;SELECT TEMP2    TO THE B.BUS
B.TEMP1:    EQU   B#10010   ;SELECT TEMP1    TO THE B.BUS
B.MDR:      EQU   B#10011   ;SELECT MDR      TO THE B.BUS
B.Q1:       EQU   B#10100   ;SELECT Q1       TO THE B.BUS
B.Q2:       EQU   B#10101   ;SELECT Q2 TO THE B.BUS(8:15) AND Q1(0:7) TO B.BUS(0:7)
B.HILO:     EQU   B#10110   ;SELECT HILO             TO THE B.BUS
READ.EAS:   EQU   B#10110   ;READ (ONLY!) WHEN IN FIRST HALF
            ;                OF MICRO_ROM (EXEC_PNT0=0):BASE
            ;                ADDRESSING.
READ.BRN:   EQU   B#10110   ;READ (ONLY!) WHEN IN SECOND HALF
            ;                OF MICRO_ROM (EXEC_PNT0=1):BRANCH
            ;                CALCULATION.

B.0.LO:     EQU   B#10111   ;SELECT XX0LO        TO THE B.BUS
B.5100:     EQU   B#11000   ;SELECT 5100 TO THE B.BUS
B.4003:     EQU   B#11001   ;SELECT 4003 TO THE B.BUS
B.FF0F:     EQU   B#11010   ;SELECT CONST FF0F TO THE B.BUS
            ;                USED TO GENERATE 000F, 0001,ETC

B.8410:     EQU   B#11011   ;SELECT CONST 8410 TO THE B.BUS
            ;                USED FOR CONFIGURATION READ.

B#11100   ** NOT USED **
            B#11101   ** NOT USED **
            B#11110   ** NOT USED **
            B#11111   ** NOT USED **
```

FIG. 6B

REGISTER ADDRESSING SYSTEM FOR EFFICIENT MICROROUTINE SHARING AND OPTIMIZATION

BACKGROUND OF THE INVENTION

1. Field of the Invention

This invention relates to microprocessor systems having improved performance characteristics.

2. Description of the Prior Art

In microcoded machines, it is common to separate the routines between effective address calculation and execution. It is desirable that as many instructions as possible share as many common effective address and execution routines as possible. However, register-to-register instructions have their operands in registers, where memory-to-register instructions have one of their operands in a Memory Data Register (MDR). This makes sharing the execution microroutine impossible without performance penalties, because at the start of the execution routine the source of the operands is different depending on the type of instruction (memory-to-register or register-to-register).

SUMMARY OF THE INVENTION

To solve this problem, the present invention provides an implied register addressing scheme such that execution routines will always have their operand sources in the same place, independent of the instructions type (memory or register). The sources or addresses of the operands reside in two registers termed HI-CNTREG and LO-CNTREG. In register-to-register instructions, these two registers are loaded with the two register fields in the instruction format. In a memory instruction, in the last micro cycle of the effective address routine, the LO-CNTREG register is loaded with the address of the source of the operands (MDR or one of two other temporary registers, TEMP1 and TEMP2). The invention is implemented by close coupling between the hardware and the relevant microword fields, and allows for efficient code sharing for double precision integer and floating point instructions, where the operands reside in two or three consecutive general purpose registers.

As an added feature of the present invention, the source registers further have two incrementors (+1, +2) to facilitate optimal double precision integer and floating point (single and extended) codes. In extended floating point operations one of the operands resides in three registers RA, RA+1, RA+2. RA is pointed at by the instruction and contains the most significant part of the operand. However, in most cases, operation starts with the least significant part (contained in RA+1 in floating point and in RA+2 in extended floating point). Typically, in prior art microprocessor systems, a cycle may be wasted incrementing the source register once or twice. This is avoided in the present invention by selecting the incremented (+2) source, in extended floating point or the +1 incremented source in double precision integer or single precision floating point.

DESCRIPTION OF THE PREFERRED EMBODIMENT

Figure 1:
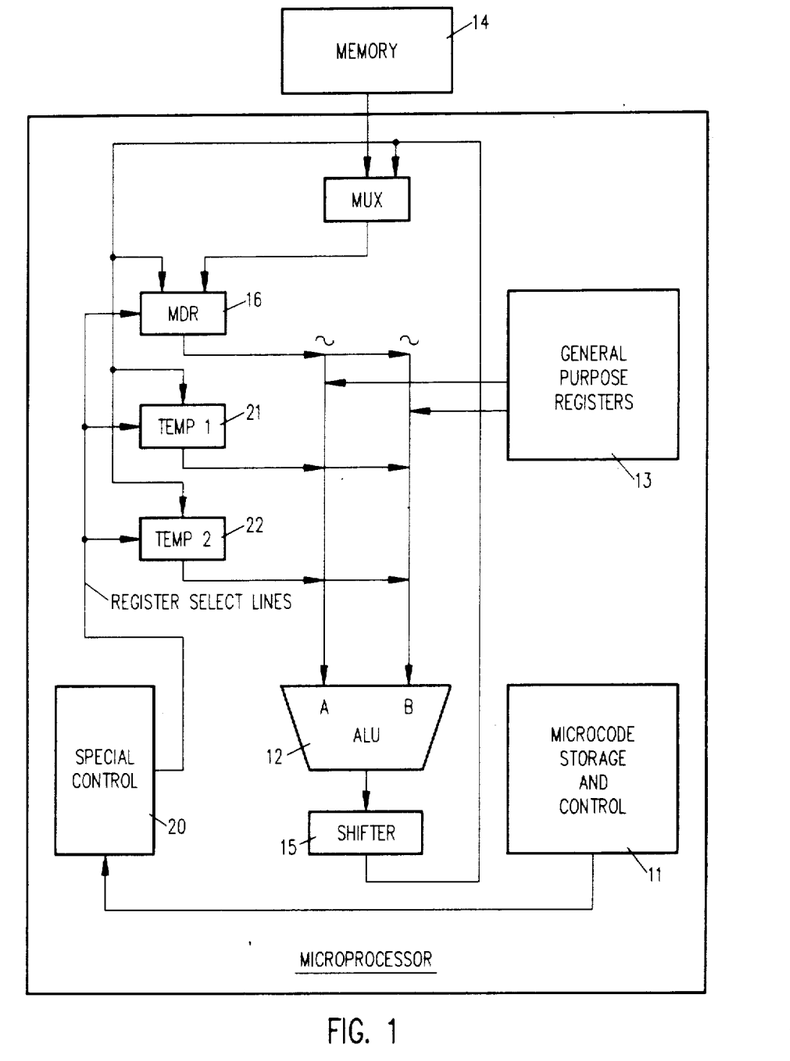
FIG. 1 is a block diagram showing a microcoded processor in which the present invention may be employed.

FIG. 1 is a block diagram showing the fundamental elements of a microcoded processor for implementing the present invention. This includes a microcode control unit 11 for executing microcode which may be stored in a read only memory (ROM) or in a random access memory (RAM), as is well known in the art. The processor also includes an arithmetic and logic unit (ALU) 12 for performing various arithmetic and logic operation, as is also well known in the art.

A group of general purpose registers is represented by reference numeral 13. Any suitable number of such registers may be employed, depending on the size of the processor. A memory 14 of a suitable type is provided and is capable of transferring operand information to a memory data register (MDR) 16, as discussed above.

The system also includes a first temporary register 21 identified as TEMP1 and a second temporary register 22 identified as TEMP2. The temporary registers and the MDR are used for storing the derived memory operands, in a manner to be discussed in detail below. FIG. 1 also shows special control circuitry identified as 20, circuitry 20 being shown and described below in connection with FIG. 2. The system of FIG. 1 also includes a shifter 15 whose input is connected to the output of ALU 12 and whose output is connected to general purpose registers 13 and to registers 16, 21, and 22.

In the description herein of the invention, it is assumed that the microprocessor is a 16 bit machine, but the invention is clearly not limited to that particular capability.

Figure 2:
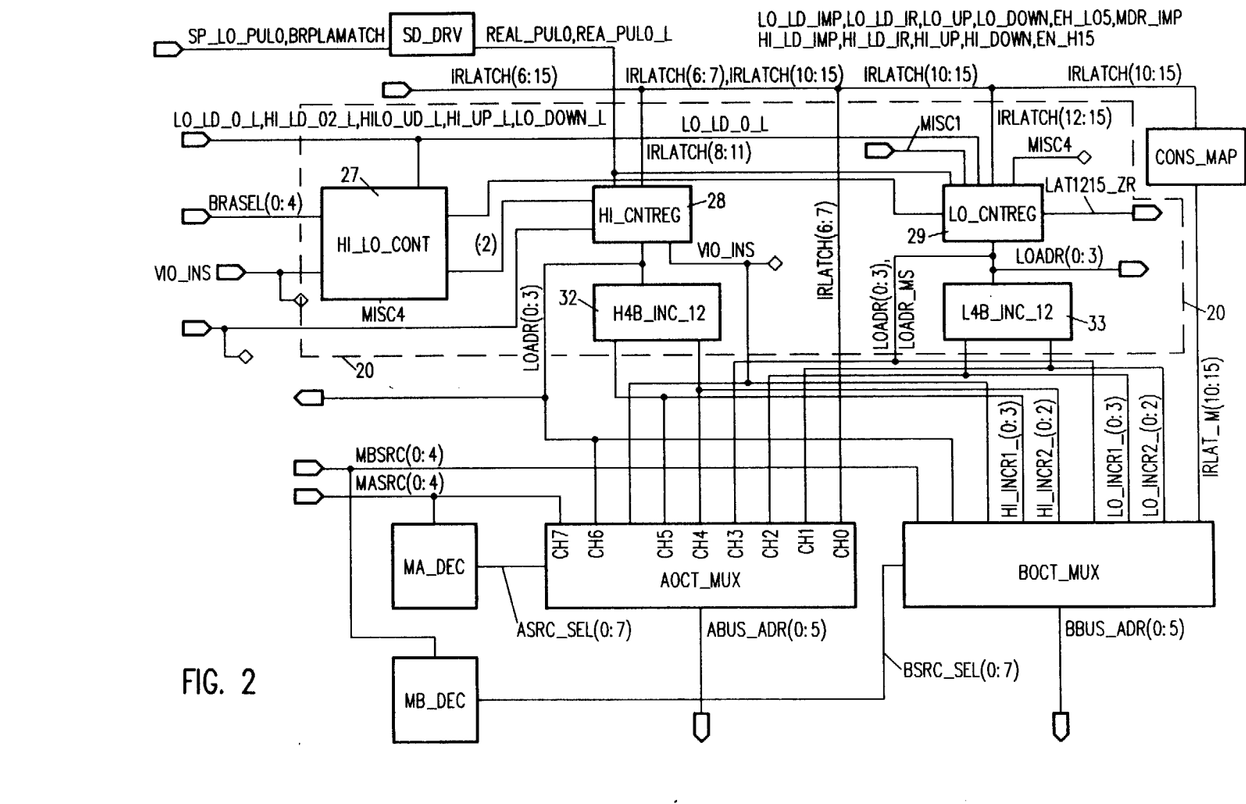
FIG. 2 is a schematic diagram illustrating the operation of the special control portion of the invention including the HI-CNTREG and LO-CNTREG registers.

FIG. 2 illustrates the special control portion 20 for carrying out the present invention. The most significant portion of the control is shown in the dotted enclosure 20 and includes a high low control 27 which supplies control signals to a HI-CNTREG 28 and a LO-CNTREG 29. The HI-CNTREG and LO-CNTREG each generate four bit patterns (in the case of the machine in which the invention is implemented), each four bit pattern defining the address of a register in which an operand which is to be executed on is located. In normal register-to-register operation, register 28 would contain the four bit address of the general purpose register containing the operand to be supplied to the A input of ALU 12, while low register 29 would contain the four bit address of the general purpose register containing the operand to be supplied to the B input of the ALU. The system functions to first calculate the effective address for the operands and then execute the instruction on these derived operands whose addresses have been calculated.

In accordance with the present invention, when the microcode indicates that it is performing the last step in the effective address calculation (by means of the EXEC.PNTR combination in the BRASEL (0:4) field shown in FIG. 2) and that execution of the microroutine part of the instruction will begin on the next cycle, if one of the operands is to be in the MDR, the microcode is assigned the default in the miscellaneous field (MISC (0:4)), indicating that the implied register is the MDR. This is implemented in LO-CNTREG 29 by modifying its contents to indicate that the address of the implied register is the MDR. This is accomplished through the lines in FIG. 2 labeled "MISC1" and "MISC4" which change the address in register 29 to that of the MDR, while HI-CNTREG 28 contains the address of the general purpose register involved in the memory-to-register operation, as defined in the instruction.

In the simplest operation, involving two 16 bit operands residing in the MDR and in a general purpose register, the address of the general purpose register containing the register operand is present in register 28, while the address in register 29 is modified as described above at the end of the effective address calculation by the "MISC1" and "MISC4" lines so that register 29 contains the MDR address. Then, when execution begins, the operands in the specified general purpose register and in the MDR are pointed to and whatever operation specified by the OP code in that instruction is carried out.

Figure 3:
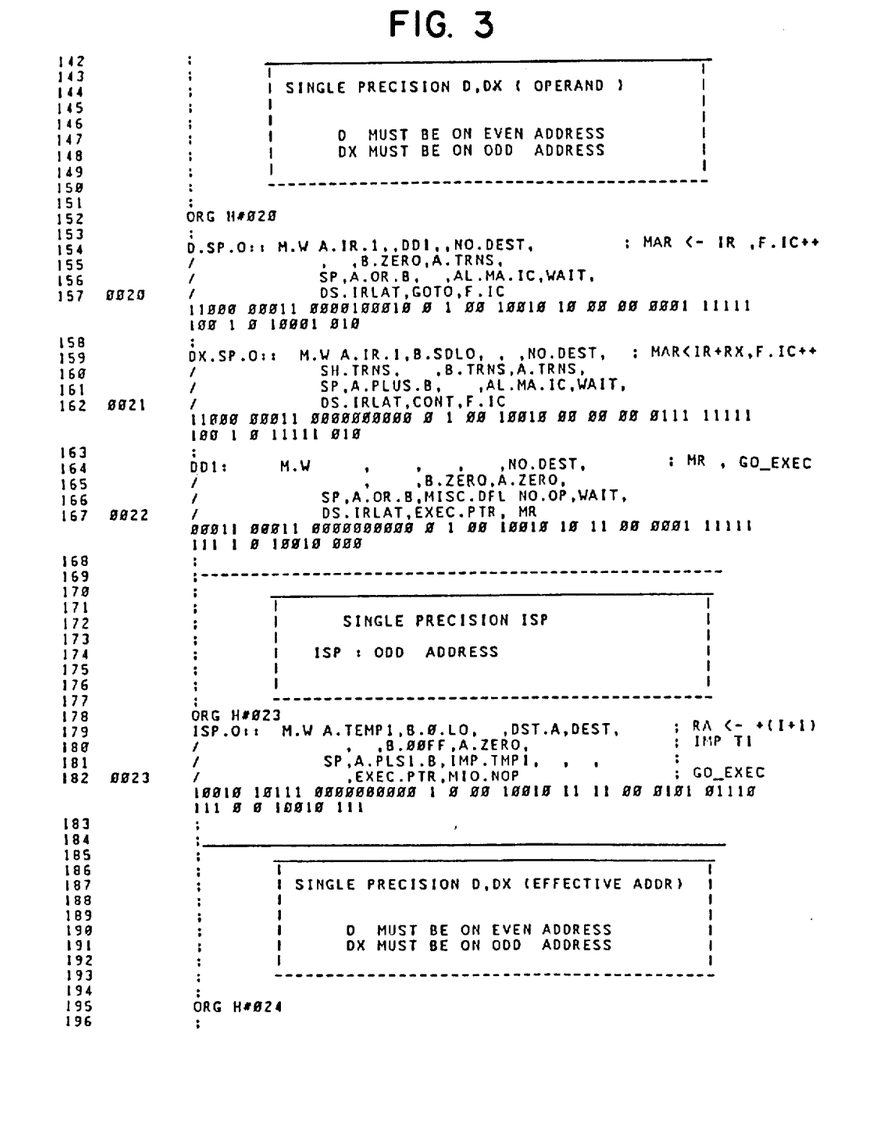
FIGS. 3-5, represent microcode listing for implementing the invention in a particular data processing system.

This is illustrated in FIG. 3 of the microcode listing attached hereto. Starting at cycle 0020 of FIG. 3, the effective address calculation, for direct or direct indexed modes, of a single precision operation is performed by taking the contents of the instruction register IR which contains the second word (displacement) in an effective address calculation, and adding it to the index register, to generate a final address. In the next cycle, cycle 0022, a memory read operation is performed, as indicated by MR in MEMIO field on line 164, and then the memory is accessed to load MDR. The miscellaneous field at that time says MISC DFL, on line 166, which is the default. The default in the miscellaneous field indicates that the implied register is MDR. This means that the LO-CNTREG 28 is going to be loaded with the MDR address. Hence, the following execution routine will find one of its operands in MDR directly.

In the case of memory-to-register operations involving operands of 32 bits each, such as would be encountered in performing double precision integer or floating point arithmetic for example, the operation of the invention is as follows. Since it is assumed that ALU 12 has the capability of operating on only 16 bit operands in one operation, the addition of two 32 bit operands will require two cycles to complete. The effective address calculation routine involves 2 reads from memory. In the first read, the most significant 16 bits of the memory operand from, say, memory location MEM1, are loaded into MDR 16. During the second cycle of a 32 bit effective address routine, the contents of memory location MEM1+1 are loaded into the MDR after the MDR contents, containing memory location MEM1 contents, have been transferred to register TEMP1 through ALU 12 and shifter 15. Thus, register TEMP1 contains the most significant 16 bits of the memory operand and the MDR contains the least significant 16 bits. Similarly, the general purpose register RA pointed at by HI-CNTREG, contains the most significant 16 bits of the 32 bit register operand and register RA+1 contains the least significant 16 bits. In order for both LO-CNTREG and HI-CNTREG to contain the addresses of the most significant 16 bit words, for both operands, in the second (and last) cycle of the effective address routine the MISC field gets IMP TMP1, causing the LO-CNTREG to be loaded with the TEMP1 register address.

Figure 4:
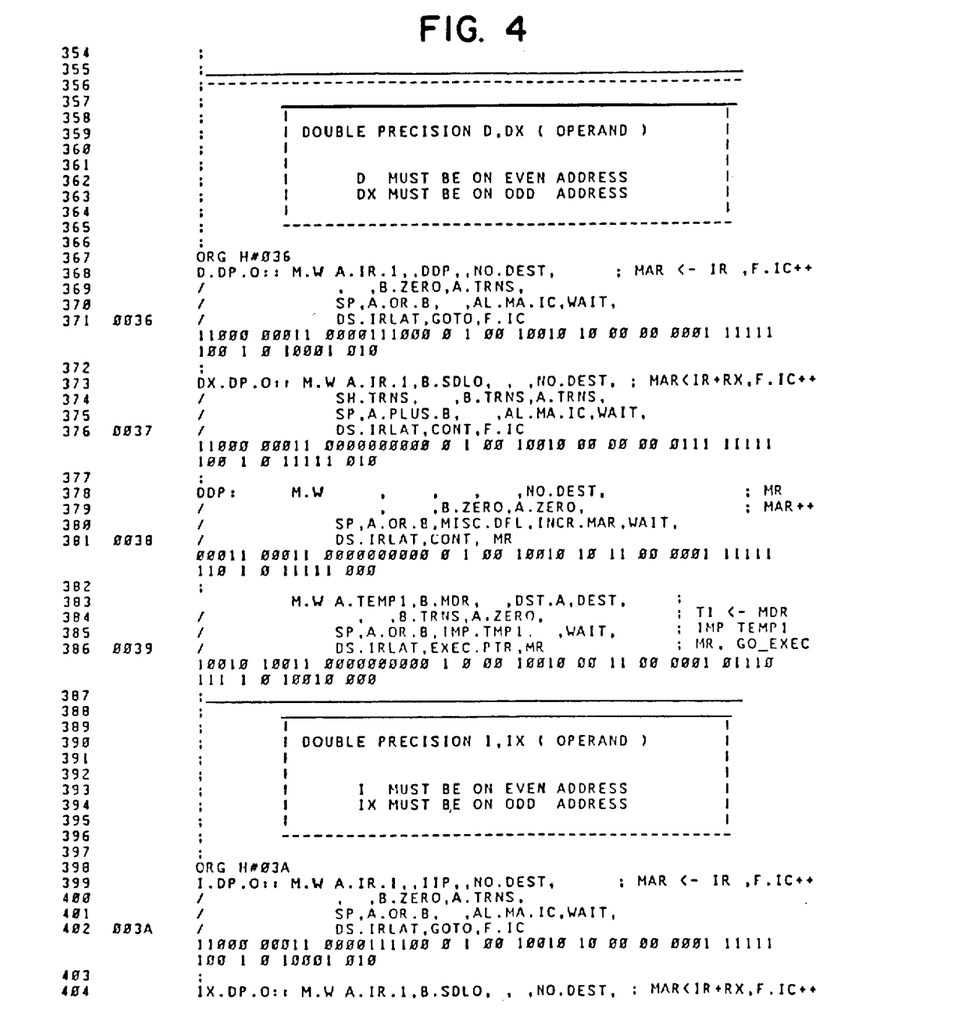

In the double precision operation, the initial two cycles 36 and 37 shown on FIG. 4 of the attached microcode listing are exactly identical to the single precision cycles 20 and 22 discussed above for the direct or direct indexed addressing modes. The index register as pointed to by the instruction format, is added to the IR which contains the second word of instruction [displacement].

Looking at cycle 38 on the attached FIG. 4 of the microcode listing, the first read of the derived memory operand is done into MDR. The comment is MAR++, which means that when reading, MAR is incremented, preparing the address of the next operand read. At cycle 0039 the system reads that operand, again to MDR. Just prior to this time the contents of MDR are moved to TEMP1 through ALU 12 and shifter 15. And the miscellaneous field indicates that the implied register is TEMP1, indicated by the IMP. TMP1 is the MISC field in cycle 0039. This means that the code of TEMP1 is inserted into the LO-CNTREG register. So the execution sequence following after that will access exactly two operands, one in the general purpose register RA, as defined by the instruction and RA+1, and the other in TEMP1, and MDR.

The present invention is also effective in handling operations which require the manipulation of two 48 bit operands, such as extended floating point arithmetic between memory and the general purpose registers. The most significant 16 bits of the 48 bit register operand are in the general purpose register whose four bit address is contained in HI-CNTREG register 28. During the first cycle of address calculation the contents of the memory address, say MEM1, containing the most significant 16 bits of the 48 bit memory operand are loaded into the MDR. During the next cycle of the effective address calculation, the second 1 bits of the 48 bit memory operand are fetched from memory location MEM1+1 into MDR, while the most significant 16 bits are transferred from the MDR to the TEMP2 register 22. During the third cycle, the least significant 16 bits of the memory operand are fetched from memory location MEM1+2 into MDR, while the contents of the MDR, representing the middle 16 bits of the 48 bit operand, are transferred to the TEMP1 register 21. This results in the least significant 16 bits being in the MDR, the middle 16 bits in register TEMP1, and the most significant 16 bits being in register TEMP2.

Figure 5:
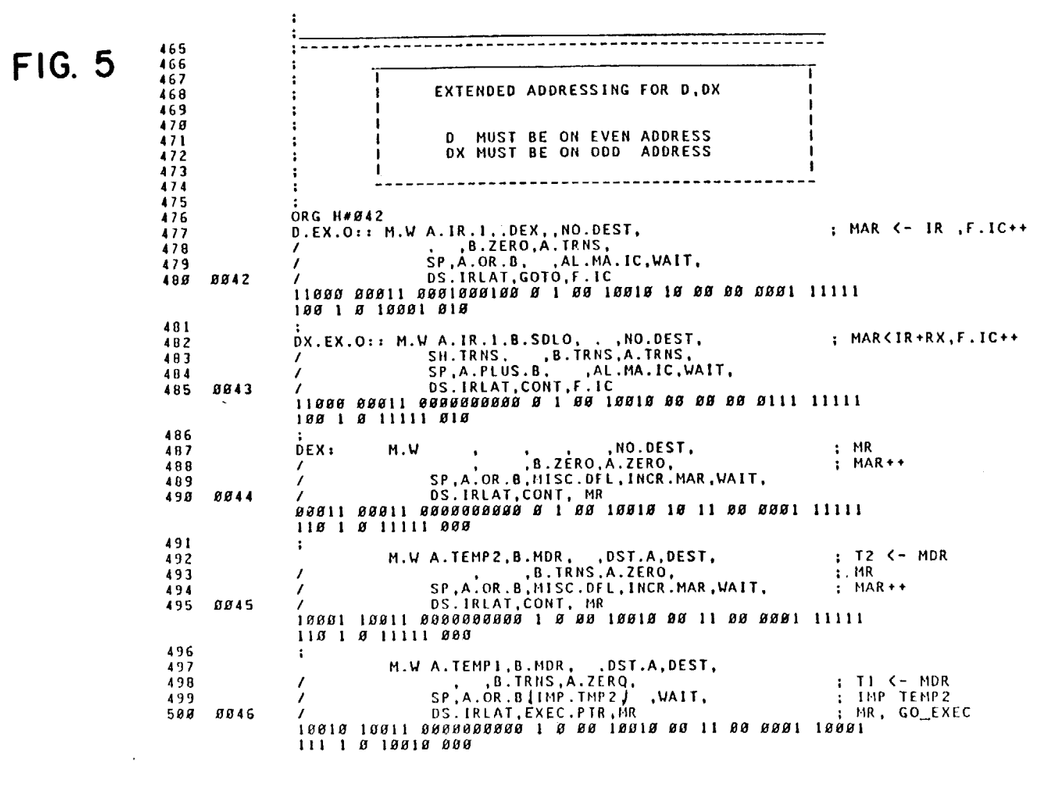

In order for both LO-CNTREG and HI-CNTREG to contain the address of the most significant word, in the third cycle of the effective address calculation routine, the MISC field gets IMP.TEMP2, causing the LO-CNTREG to be loaded with the TEMP2 register address. In the case of an extended addressing for D or DX modes, the first two cycles are exactly identical to single and double precision cases. Again, the effective address is calculated by adding the index register to IR, going to memory, getting the first word to MDR, incrementing MAR at the same time, returning and reading the second word into MDR, at the same time loading the contents of the MDR to TEMP2 so that TEMP2 will contain the most significant part of the 48 bit operand. In the last cycle, cycle number 0046 shown on FIG. 5 of the attached micrcode, the third read is performed into MDR. At this time, the contents of MDR are moved to TEMP1 so TEMP1 now contains the middle 16 bit part of the word and TEMP2 contains the most significant 16 bit part of the 48 bit word. In the MISC field, TEMP2 is implied (line 499) which means that TEMP2 address is loaded into LO-CNTREG. Hence, at this point, HI-CNTREG contains the address of the register RA as defined in the instruction; and LO-CNTREG contains the implied TEMP2, and the execution routine can start. The 48 bits of the register operand are placed in registers RA, RA+1 and RA+2 and the 48 bits of the derived memory operand reside in TEMP2, TEMP1 and MDR. The extended floating point arithmetic operation may then be executed by the microprocessor in the normal fashion.

Another feature of the present invention operates to increase the speed and hence the performance of the processor. During an address calculation, the outputs of registers 28 and 29 are supplied through combinatorial logic circuits 32 and 33, respectively, where the addresses from registers 28, 29 are each incremented by +1 and by +2 so that the addresses in register 28, 29 and those addresses plus one and plus two are available at the outputs of networks 32, 33. Thus, assuming that the most significant 16 bits for the register portion of the operation are in general purpose register RA, the addresses for register RA, register RA+1 and Register RA+2 are available at element 32. Similarly, the addresses, for registers TEMP1, TEMP2 and MDR, respectively, are available at the output of element 33. Thus, this feature of the present invention avoids the prior art limitation of requiring a separate cycle to increment the addresses by one.

As shown in the attached FIG. 6 of field definitions, the address assignments in the MASRC(0:4) and MBSRC(0:4) microcode fields for the MDR, TEMP1, and TEMP2 registers, were selected such that MDR(10011) is an increment of TEMP1(10010) that is an increment of TEMP2(10001). Also the bit assignments in the MISC(0:4) field were chosen such that bits MISC1 and MISC4 will determine the 2 least significant bits of the implied registers (11 for MDR, 10 for TMP1 and 01 for TEMP2).

Thus, in double precision integer or floating point, HI CNTREG points to RA which contains the most significant 16 bits of the register operand, while LO-CNTREG, using the implied register mechanism, will point to TEMP1. The +1 increments of RA and TEMP1 will point to RA+1 and MDR, respectively, where the least significant 16 bits of the 2 operands reside. Similarly, in extended floating point, the most significant 16 bit word is pointed at by HI-CNTREG pointing at RA and LO-CNTREG, using the implied register mechanism, will point to TEMP2. The +1 increments will point to RA+1 and TEMP1, respectively, where the middle 16 bit words reside, and the +2 increments will point to RA+2 and MDR, respectively, where the least significant 16 bit words reside. This is identical to register to register cases where HI-CNTREG and LO-CNTREG will point at RA and RB, respectively, the +1 increments will point at RA+1 and RB+1, and the +2 increment will point at RA+2 and RB+2, respectively. This achieves a uniform treatment of all operands, register or memory in the effective address calculation routines, allowing normal sharing of the execution routines.

We claim:

1. In a microcoded data processing system, said system providing for register-to-register operations and for memory-to-register operations, said system permitting common microcode execution routines to be employed in processing means operating on memory operands and register operands after effective address calculations for said operands; said system including:

memory means for storing memory operands to be used in said memory-to-register operations;

a plurality of separately addressable general purpose registers for storing register operands to be utilized in said register-to-register operations;

first address register means for generating the address of a first of said general purpose registers containing one of said operands for one of said register-to-register operations;

second address register means for generating the address of a second of said general purpose registers containing another of said operands for said one of said register-to-register operations;

a memory data register for storing one of said memory operands for use in one of said memory-to-register operations, said memory data register having its own address designation;

means responsive to initiation of a register-to-register operation for utilizing the addresses generated by said first and said second address register means to select those of said general purpose registers whose operands are to be utilized in said register-to-register operation;

means for supplying said operands from said selected registers to said processing means;

means responsive to initiation of a memory-to-register operation for causing said address designation of said memory address register to be generated by said second address generating means;

means responsive to generating of said memory data register address designation for supplying one of said memory operands from said memory means to said memory data register; and means for supplying operands from said memory data register and the one of said general purpose registers selected by said first address generating means to said processing means;

whereby said register-to-register operations and said memory-to-register operations can share common microcode execution routines.

2. A system in accordance with claim 1 including:

at least one temporary register;

said system performing some operations requiring the use of multipart memory operands and multipart register operands;

means for storing a first part of one of said multipart register operands in a first one of said general purpose registers;

means for storing a second part of one of said multipart register operands in a second one of said general purpose registers;

means for first storing a first part of one of said multipart memory operands in said memory data register;

means for alter transferring said first part of said memory operand from said memory data register to said temporary register; and means for storing a second part of said multipart memory operand in said memory data register.

3. A system in accordance with claim 2 in which each of said multipart memory and register operands has two parts.

4. A system in accordance with claim 2 in which said multipart memory operand has three parts;

a first and a second temporary register;

means for first storing said first part of said memory operand in said memory data register;

means for later transferring said first part of said memory operand from said memory data register to said second temporary register and for storing said second part of said memory operand in said memory data register; and means for then transferring said second part of said memory operand to said first temporary register and for storing said third part of said three part memory operand in said memory data register.

5. A system in accordance with claim 3 including means for simultaneously generating the addresses of said memory data register and said temporary register at the completion of said effective address calculation.

6. A system in accordance with claim 5 including means for simultaneously generating the addresses of said memory data register and said first and second temporary registers at the completion of said effective address calculation.

7. A system in accordance with claim 4 in which said multipart register operand has three parts, said system including:

means for storing a third part of one of said multipart register operands in a third one of said general purpose registers.

8. A system in accordance with claim 5 in which said generated addresses of said memory data register and said temporary register are continuously available during said microcode execution routines.

9. A system in accordance with claim 6 in which said generated addresses of said memory data register and said first and said second temporary registers are binarily adjacent addresses.

* * * * *

UNITED STATES PATENT AND TRADEMARK OFFICE
CERTIFICATE OF CORRECTION

PATENT NO. : 4,807,124

DATED : 02/21/89

INVENTOR(S) : Yeshayahu Mor; Leonardo Sandman; Yeshayahu Schatzberger;

It is certified that error appears in the above-identified patent and that said Letters Patent is hereby corrected as shown below:

In column 4, line 36, "1" should read --16--.

In column 4, lines 37-45, type is smaller than the rest of the text.

In column 6, line 53, "alter" should read --later--.

Signed and Sealed this

Seventeenth Day of April, 1990

*Attest:*

HARRY F. MANBECK, JR.

*Attesting Officer*  *Commissioner of Patents and Trademarks*